(12) United States Patent
Fry (10) Patent No.: US 10,095,008 B1
(45) Date of Patent: Oct. 9, 2018

(54) LENS ASSEMBLY WITH SWITCHED ULTRA-NARROW FIELD-OF-VIEW CONFIGURATION

(71) Applicant: Lockheed Martin Corporation, Bethesda, MD (US)

(72) Inventor: James A. Fry, Orlando, FL (US)

(73) Assignee: Lockhead Martin Corporation, Bethesda, MD (US)

( * ) Notice: Subject to any disclaimer, the term of this patent is extended or adjusted under 35 U.S.C. 154(b) by 202 days.

(21) Appl. No.: 14/950,437

(22) Filed: Nov. 24, 2015

(51) Int. Cl.
*G02B 13/14* (2006.01)
*G02B 15/10* (2006.01)
*G02B 15/16* (2006.01)

(52) U.S. Cl.
CPC .......... *G02B 15/10* (2013.01); *G02B 13/146* (2013.01); *G02B 15/161* (2013.01)

(58) Field of Classification Search
None
See application file for complete search history.

(56) References Cited

U.S. PATENT DOCUMENTS

| | | | |
|---|---|---|---|
| 4,946,265 A * | 8/1990 | Shimizu | G02B 21/025 359/381 |
| 6,310,345 B1 * | 10/2001 | Pittman | G01J 4/00 250/330 |
| 6,356,307 B2 * | 3/2002 | Ohkawara | G02B 7/102 348/345 |
| 6,624,931 B2 * | 9/2003 | Katsumata | G02B 21/00 359/363 |
| 7,408,159 B1 | 8/2008 | Amon | |
| 2005/0243411 A1 | 11/2005 | Cook | |
| 2007/0086087 A1 * | 4/2007 | Dent | G02B 15/04 359/399 |
| 2014/0002665 A1 * | 1/2014 | Kingdon | H04N 5/33 348/164 |

* cited by examiner

*Primary Examiner* — Derek S Chapel
(74) *Attorney, Agent, or Firm* — Withrow & Terranova, PLLC (57) ABSTRACT

A lens assembly includes a housing defining an interior volume having a substantially linear optical axis extending therethrough. A zoom group is disposed in the housing in an optical path segment on the optical path between a first lens and an aperture mechanism. The zoom group is movable between a plurality of field-of-view (FOV) positions along the optical path segment. An ultra-narrow field-of-view (UNFOV) lens group is movable between a first UNFOV position outside the optical path and a second UNFOV position in the optical path segment. The lens assembly has a plurality of FOV configurations with the UNFOV lens group in the first UNFOV position, and a UNFOV configuration with the UNFOV lens group in the second UNFOV position. The lens assembly accommodates a number of different FOVs within a limited volume with a small number of lenses, and without folding or otherwise redirecting the optical path.

21 Claims, 10 Drawing Sheets

LENS ASSEMBLY WITH SWITCHED ULTRA-NARROW FIELD-OF-VIEW CONFIGURATION

TECHNICAL FIELD

The disclosure relates to a lens assembly with a switched ultra-narrow field-of-view (UNFOV) configuration, and related components, systems, and methods.

BACKGROUND

A "B-Kit" is a standardized housing for optical assemblies, such as "Improved Forward-Looking Infrared" (IF-LIR) assemblies, in military and other applications. The B-Kit is designed to be integrated with different "A-Kits" in a modular manner, with each A-Kit configured to be installed in a specific vehicle, such as M1, M2, M3, and BFIST tanks as well as the LRAS3 for various scout vehicles and other military vehicles. Accordingly, the limited interior space in a B-Kit housing places design constraints on optical assemblies used in the B-Kit. The optical assembly may have additional design constraints as well. For example, an IFLIR assembly for use with the B-Kit is required to have at least four parfocal fields-of-view (FOVs), including a wide field of view (WFOV), a medium field of view (MFOV), a narrow field of view (NFOV), and an ultra-narrow field of view (UNFOV). All four FOVs must be operable at an aperture of substantially F/4.0, and the WFOV, MFOV, and NFOV must also be operable at an aperture of substantially F/2.5. Thus, there is a need for an optical assembly that meets these parameters.

SUMMARY

Embodiments include a lens assembly having a plurality of fields of view (FOVs). The lens assembly includes a housing defining an interior volume having a substantially linear optical axis extending therethrough. A first lens and an aperture mechanism are disposed in the housing in the optical path, defining an optical path segment therebetween. A zoom group is disposed in the housing in an optical path segment on the optical path between the first lens and the aperture mechanism. The zoom group is movable between a plurality of field-of-view (FOV) positions along the optical path segment, to facilitate a plurality of different FOVs for the lens assembly. The lens assembly also includes an ultra-narrow field-of-view (UNFOV) lens group movable between a first UNFOV position outside the optical path and a second UNFOV position in the optical path segment. The lens assembly has a plurality of FOV configurations each comprising the zoom group disposed at one of the plurality of FOV positions and the UNFOV lens group in the first UNFOV position outside the optical path. The lens assembly also has a UNFOV configuration comprising the zoom group disposed at one of the plurality of FOV positions and the UNFOV lens group in the second UNFOV position in the optical path segment. In this manner, the lens assembly is able to accommodate a number of different FOVs, including a UNFOV, within a limited volume with a small number of lenses, and without folding or otherwise redirecting the optical path.

In one embodiment, a lens assembly is disclosed. The lens assembly comprises a housing defining an interior volume having a substantially linear optical axis extending therethrough. The lens assembly further comprises a first lens disposed in the housing in the optical path. The lens assembly further comprises an aperture mechanism disposed in the housing in the optical path, the first lens and the aperture mechanism defining an optical path segment on the optical axis therebetween. The lens assembly further comprises a zoom group disposed in the housing in the optical path segment, the zoom group movable between a plurality of FOV positions along the optical path segment. The lens assembly further comprises a UNFOV lens group movable between a first UNFOV position outside the optical path and a second UNFOV position in the optical path segment. The lens assembly has a plurality of FOV configurations each comprising the zoom group disposed at one of the plurality of FOV positions and the UNFOV lens group in the first UNFOV position. The lens assembly has a UNFOV configuration comprising the zoom group disposed at one of the plurality of FOV positions and the UNFOV lens group in the second UNFOV position.

In another embodiment, a method of operating a lens assembly is disclosed. The method comprises moving a zoom group disposed in an interior volume of a housing to a predetermined FOV position in an optical path segment extending between a first lens disposed in the housing and an aperture mechanism disposed in the housing. The method further comprises moving a UNFOV lens group from a first UNFOV position outside the optical path to a second UNFOV position in the optical path segment.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first FOV configuration" and "second FOV configuration," and does not imply a priority, a type, an importance, or other attribute, unless otherwise stated herein. The term "substantially" used herein in conjunction with a numeric value means any value that is within a range of five percent greater than or ten percent less than the numeric value.

Embodiments include a lens assembly having a plurality of fields of view (FOVs). The lens assembly includes a housing defining an interior volume having a substantially linear optical axis extending therethrough. A first lens and an aperture mechanism are disposed in the housing in the optical path, defining an optical path segment therebetween. A zoom group is disposed in the housing in an optical path segment on the optical axis between the first lens and the aperture mechanism. The zoom group is movable between a plurality of field-of-view (FOV) positions along the optical path segment, to facilitate a plurality of different FOVs for the lens assembly. The lens assembly also includes an ultra-narrow field-of-view (UNFOV) lens group movable between a first UNFOV position outside the optical path and a second UNFOV position in the optical path segment. The lens assembly has a plurality of FOV configurations each comprising the zoom group disposed at one of the plurality of FOV positions and the UNFOV lens group in the first UNFOV position outside the optical path. The lens assembly also has a UNFOV configuration comprising the zoom group disposed at one of the plurality of FOV positions and the UNFOV lens group in the second UNFOV position in the optical path segment. In this manner, the lens assembly is able to accommodate a number of different FOVs, including a UNFOV, within a limited volume with a small number of lenses, and without folding or otherwise redirecting the optical path.

Figure 1A:
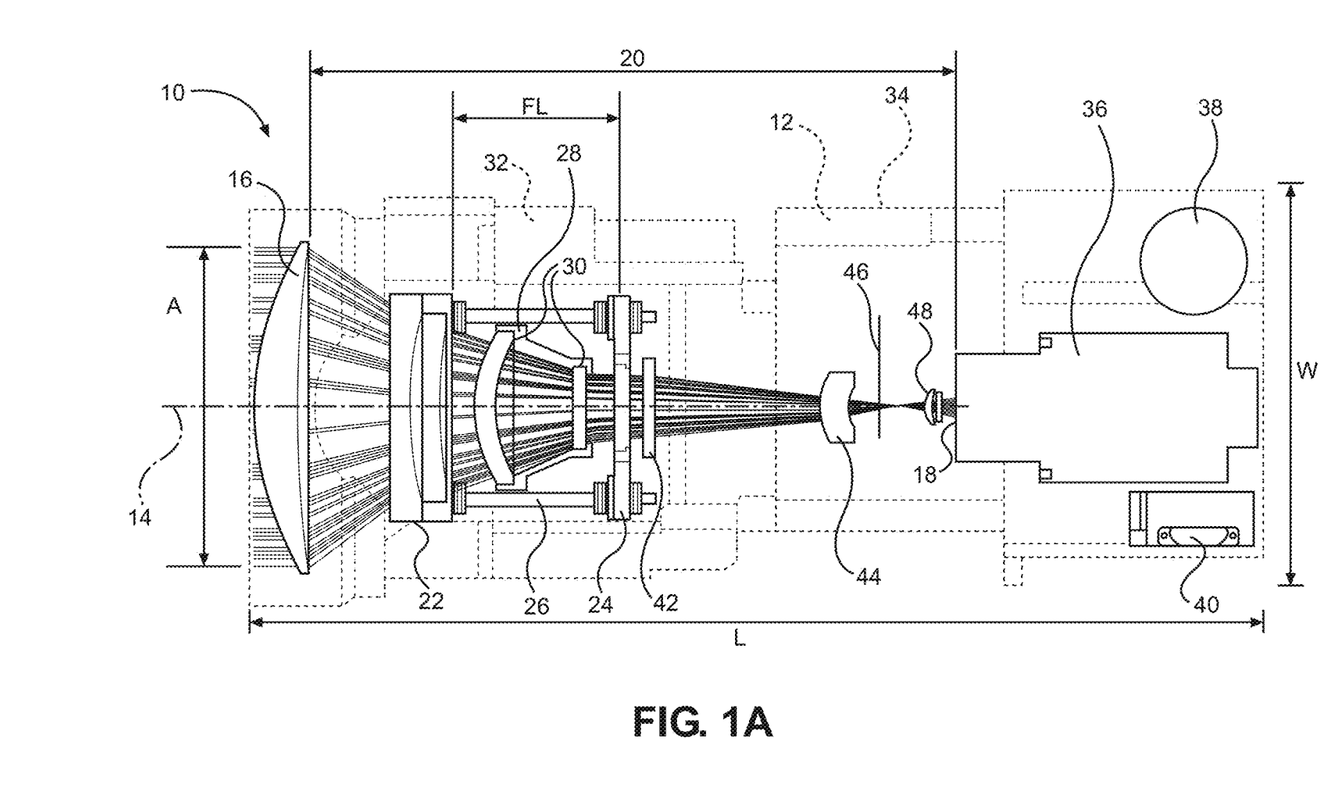
FIG. 1A illustrates a top cutaway view of a lens assembly having a switched ultranarrow field-of-view (UNFOV) configuration, according to an embodiment.
Figure 1B:
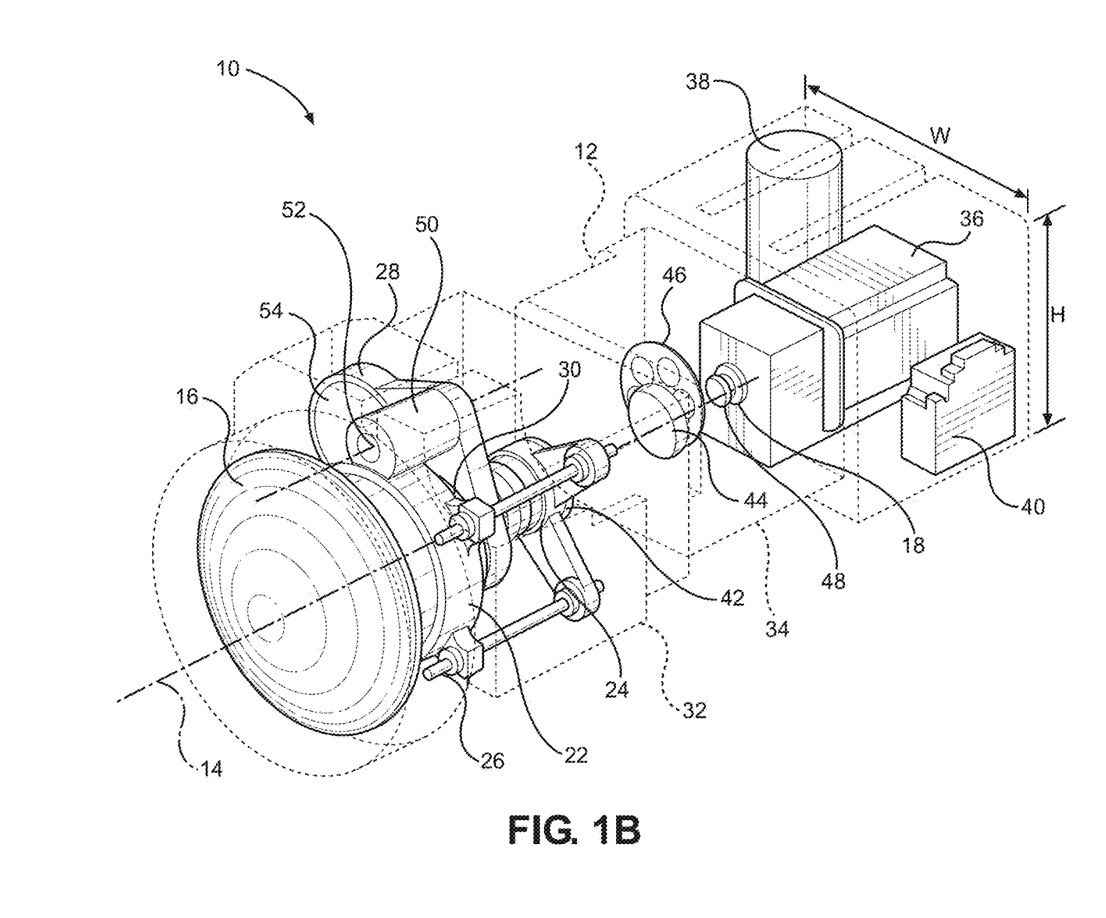
FIG. 1B illustrates an isometric view of the lens assembly of FIG. 1A.

In this regard, FIGS. 1A and 1B illustrate respective top cutaway and isometric views of a lens assembly 10 having a plurality of parfocal FOVs. The lens assembly 10 includes a B-Kit housing 12 defining an interior volume having a substantially linear optical axis 14 extending therethrough. An objective lens 16 and a variable aperture mechanism 18 are disposed in the housing 12 on the optical axis 14, defining an optical path segment 20 on the optical axis 14, therebetween. A first zoom group 22 and a second zoom group 24 are disposed in the housing 12 in an optical path segment 20 on the optical axis 14 between the objective lens 16 and the variable aperture mechanism 18. Each zoom group 22, 24 may have one or more individual lenses that move together with the respective zoom group 22, 24 as a unit. The first zoom group 22 and second zoom group 24 are independently movable, via a plurality of rails 26 running substantially parallel to the optical axis 14. The first zoom group 22 and second zoom group 24 are movable between a plurality of FOV positions and combinations of positions in the optical path segment 20, to facilitate a plurality of different FOVs for the lens assembly 10.

The lens assembly 10 also includes a UNFOV sub-assembly 28 including a UNFOV lens group 30 movable between a first UNFOV position outside the optical axis 14 and a second UNFOV position in the optical path segment 20. In this embodiment, the UNFOV lens group 30 has four lenses, two of which are not shown in FIG. 1A. The UNFOV lens group 30 is illustrated and described in detail with respect to FIG. 3D and the accompanying description below. The lens assembly 10 has a plurality of FOV configurations each comprising the first zoom group 22 and the second zoom group 24 each disposed at one of the plurality of FOV positions and the UNFOV lens group 30 in the first UNFOV position outside the optical axis 14. The lens assembly 10 also has a UNFOV configuration comprising the first zoom group 22 and the second zoom group 24 each disposed at one of the plurality of FOV positions and the UNFOV lens group 30 in the second UNFOV position in the optical path segment 20. In this manner, the lens assembly 10 is able to accommodate a number of different FOVs, including a UNFOV, within a limited volume, and without folding or otherwise redirecting the optical path to a different optical axis from the optical axis 14.

In this regard, the housing 12 may correspond to a standardized housing of a B-Kit, which may include a forward housing section 32 and rear housing section 34 for example. As described above, a B-Kit is a standardized housing for optical assemblies, such as "Improved Forward-Looking Infrared" (IFLIR) assemblies, and is designed to be integrated with different "A-Kits," each of which is configured to be installed in a specific vehicle, such as a military vehicle. Accordingly, the interior volume of the housing 12 may be an important design constraint on the lens assembly 10, because the housing 12 must accommodate the entire optical path segment 20, including the zoom groups 22, 24, the UNFOV sub-assembly 28, stationary lens 44, filter wheel assembly 46, focus group 48, as well as a Dewar sub-assembly 36 and other components such as a cooler component 38 and a cooler control module 40. Another design requirement for the B-Kit is that each of a plurality of FOVs is parfocal, that is, does not require independent focusing, for each FOV. The design requirements of the B-Kit also require that the B-Kit be capable of a wide field of view (WFOV), a medium field of view (MFOV), a narrow field of view (NFOV), and an ultra-narrow field of view (UNFOV). The IFLIR specification also requires each of the WFOV, MFOV, and NFOV to be operable at apertures of substantially F/2.5 and F/4.0, and the UNFOV is required to be operable at an aperture of substantially F/4.0. It should be understood, however, that it is not physically possible for the UNFOV to operate at F/2.5 in a B-Kit housing 12, because the objective lens 16 would need to be so large to allow enough light into the lens assembly 10, that the objective lens 16 would not fit in the housing 12.

As can be seen in FIGS. 1A and 1B, the B-Kit housing 12 in this embodiment has a limited volume. For example, a standardized B-Kit has a maximum width W of approximately 7.0 inches, a maximum height H of approximately 7.0 inches, and a maximum length L of approximately 16.8 inches. These dimensions result in a rectangular prism having an internal volume of substantially 824 cubic inches, but it is apparent that some dimensions of the B-Kit housing 12 are substantially smaller than the maximum dimensions, and thus the internal volume of the B-Kit housing is substantially less than a theoretical maximum of 824 cubic inches. It can also be seen that, for the entire optical path segment 20 to be contained within the B-Kit housing 12, the optical path segment 20 must have a linear length of significantly less than 16.8 inches. As discussed above, these and other design constraints imposed by the B-Kit specification make it more difficult to provide a lens assembly 10 that is capable of all of the required FOVs and apertures. It is particularly difficult to do so without folding or otherwise redirecting the optical axis 14, which can increase complexity and cost of the lens assembly 10. Here, however, by providing the UNFOV sub-assembly 28 movably mounted on a pivot 50 having an axis 52 parallel to the optical axis 14, the UNFOV sub-assembly can be moved in and out of the optical path segment 20 as needed while using a minimum amount of space within the internal volume of the housing 12. In some embodiments, the UNFOV sub-assembly 28 may also include a second lens 54 or lens group that can be switched in and out of the optical path segment 20 in place of the UNFOV lens group 30.

Accordingly, it is desirable to provide a lens assembly 10 having a substantially linear optical axis 14 that can be contained within the interior volume of a B-Kit housing 12 while meeting the additional design requirements of the IFLIR specification. In this regard, referring now to FIG. 2, a partial cross-sectional view of the optical elements of the lens assembly 10 is illustrated. In this embodiment, the objective lens 16 is formed from zinc selenide (ZnSe). The first zoom group 22 includes a barium fluoride ($BaF_2$) lens 56 and an Infrared Glass 25 (IRG 25) lens 58. In this embodiment, the second zoom group 24 includes a silicon lens 60 formed from float zone silicon.

Figure 2:
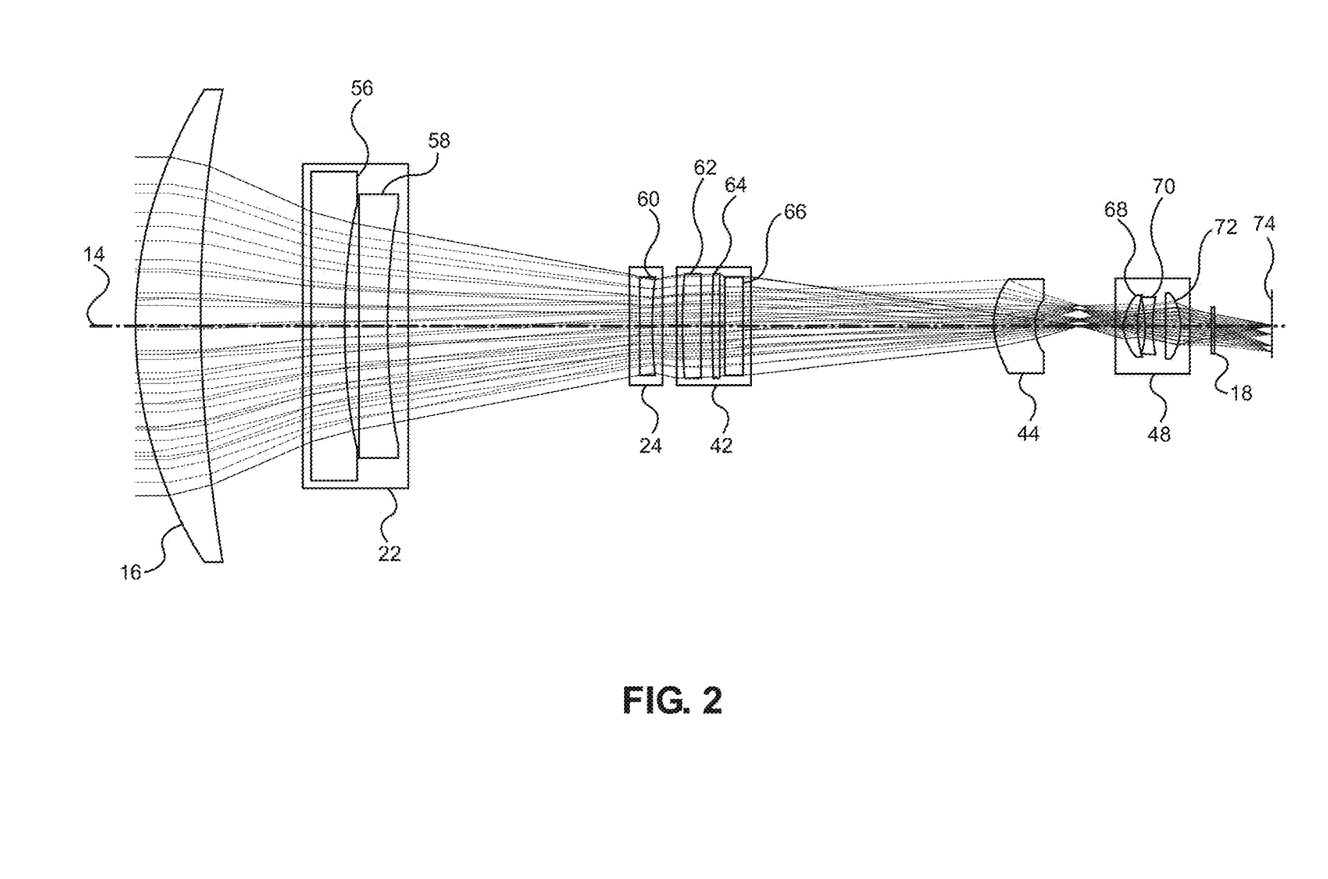
FIG. 2 illustrates a detailed partial top cutaway view of the lens assembly of FIGS. 1A and 1B.

Many applications that require transmission of long-wave infrared (LWIR), such as IFLIR, generally do not use silicon lenses, because traditional silicon lenses may not transmit LWIR wavelengths without significant reflection and absorption of the LWIR wavelengths of interest. In this embodiment, however, the B-Kit specification only requires that LWIR wavelengths up to approximately 10.3 microns be transmitted. Float zone silicon, however, is able to transmit LWIR wavelengths up to this threshold, with a boost in transmission in the 9 micron range. The process for forming float-zone silicon removes impurities that lead to transmittance reduction. These impurities are not normally removed through conventional Czochralski crystal growth used to form conventional optical grade silicon. Thus, because float-zone silicon is more transmissive than optical grade silicon for the LWIR wavelengths of interest, it is possible to use a silicon lens 60 as part of the second zoom group 24 and elsewhere in the lens assembly 10, while still meeting the IFLIR specification.

Turning now to the fixed lens group 42, the fixed lens group 42 includes a first Infrared Glass 24 (IRG 24) lens 62 and a second IRG 24 lens 64, along with a multi-spectral zinc sulfide (MS ZnS) lens 66. Stationary lens 44 is also composed of IRG 24. A focus group 48 includes a float zone silicon lens 68, a germanium lens 70, and another float zone silicon lens 72. In this manner, the lens assembly 10 is configured to direct the medium-wave infrared (MWIR) and the long-wave infrared (LWIR) wavelengths through the variable aperture mechanism 18 and onto an image plane 74 of the focal plane array of the Dewar sub-assembly 36 (not shown).

Each lens in the lens assembly 10 has a specific function, such as correcting for monochromatic aberrations such as spherical aberration, coma, astigmatism, and distortion. For example, the IRG 24 lenses 62, 64 have dispersive properties that allow for chromatic aberration correction. Chromatic aberration occurs when some wavelength bands are in focus at the same point while other wavelength bands are not in focus at that same point. Notably, however, the total number of lenses in the lens assembly 10 in this embodiment is less than conventional B-Kit lens assemblies, with eleven (11) total optical elements for the WFOV, MFOV, and NFOV configurations, and fifteen (15) total optical elements for the UNFOV configuration.

Figure 3A:
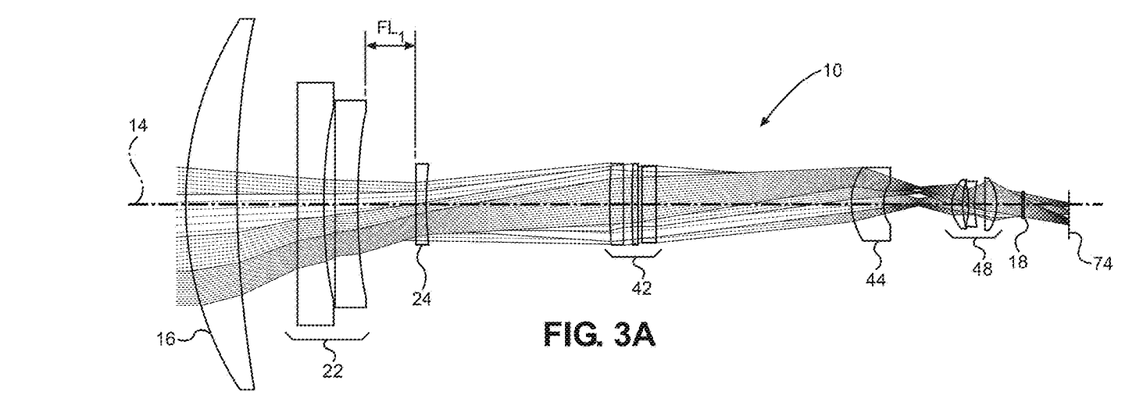
FIG. 3A illustrates a partial top cutaway view of the lens assembly of FIGS. 1A-2 in a wide field-of-view (WFOV) configuration.
Figure 3B:
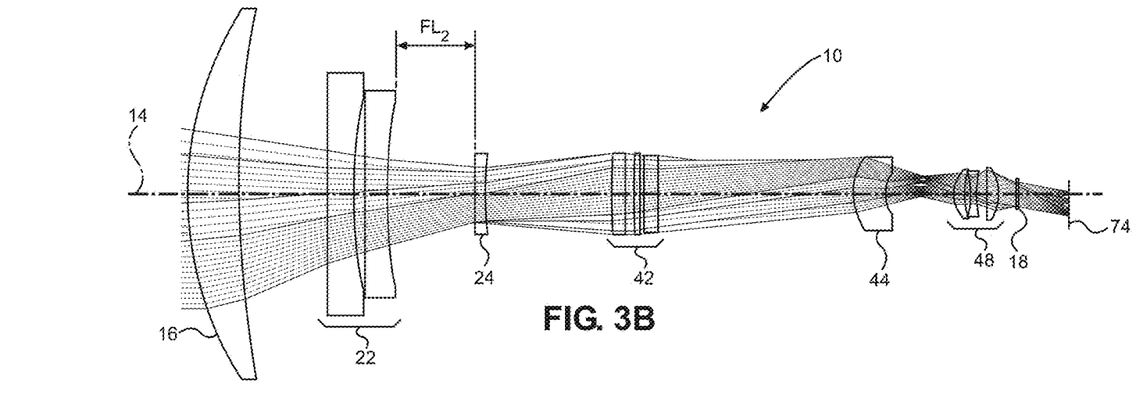
FIG. 3B illustrates a partial top cutaway view of the lens assembly of FIGS. 1A-2 in a medium field-of-view (MFOV) configuration.
Figure 3C:
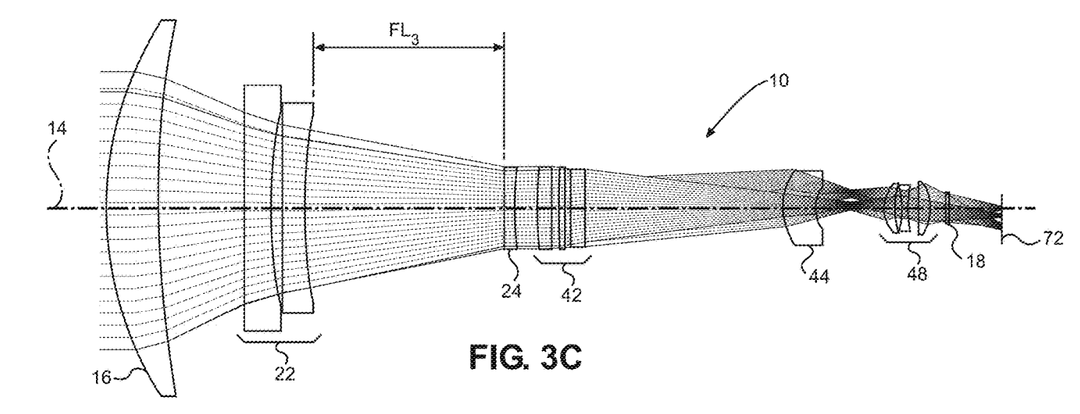
FIG. 3C illustrates a partial top cutaway view of the lens assembly of FIGS. 1A-2 in a narrow field-of-view (NFOV) configuration.

To switch between the different FOV configurations, the first zoom group 22 and second zoom group 24 are independently moved in the optical path segment 20 so that the first zoom group 22 and second zoom group 24 are separated by a predetermined distance for each FOV. In this regard, FIG. 3A illustrates a partial top cutaway view of the lens assembly 10 of FIGS. 1A-2 in a WFOV configuration. In the WFOV configuration, the first zoom group 22 is moved to first predetermined distance from the first lens, and the second zoom group 24 is moved to a first predetermined distance ($FL_1$) from the first zoom group 22. FIG. 3B illustrates a partial top cutaway view of the lens assembly 10 of FIGS. 1A-2 in a MFOV configuration. In the MFOV configuration, the first zoom group 22 is moved to second predetermined distance from the first lens, and the second zoom group 24 is moved to a second predetermined distance ($FL_2$) from the objective lens 16, which is greater than the first predetermined distance ($FL_1$). The total distance between the objective lens 16 and the second zoom group 24 in the MFOV configuration is also larger than the total distance between the objective lens 16 and the second zoom group 24 in the WFOV configuration. FIG. 3C illustrates a partial top cutaway view of the lens assembly 10 of FIGS. 1A-2 in a NFOV configuration. In the NFOV configuration, the first zoom group 22 is moved to third predetermined distance from the first lens, and the second zoom group 24 is moved to a third predetermined distance ($FL_3$) from the first lens group. The total distance between the objective lens 16 and the second zoom group 24 in the NFOV configuration is also larger than the total distance between the objective lens 16 and the second zoom group 24 in the MFOV configuration.

Figure 3D:
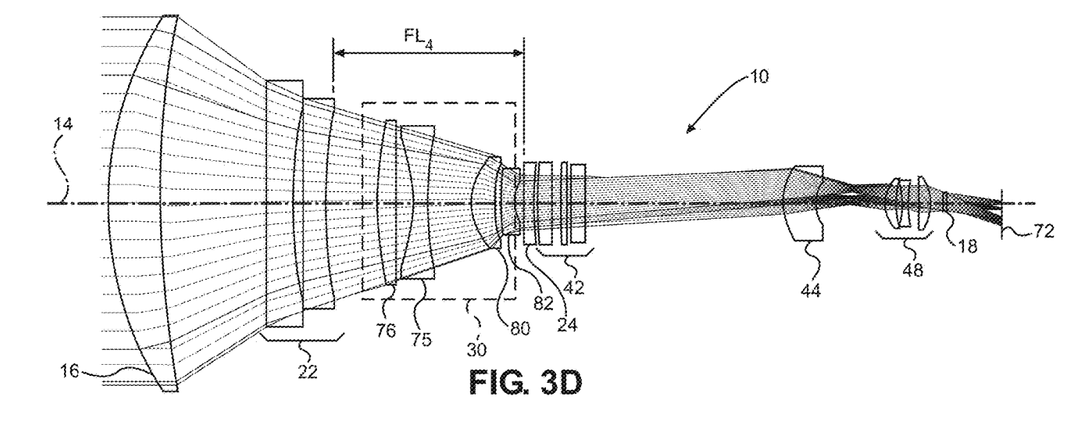
FIG. 3D illustrates a partial top cutaway view of the lens assembly of FIGS. 1A-2 in an ultranarrow field-of-view (UNFOV) configuration, with a switched UNFOV lens group moved into the optical path of the lens assembly.

FIG. 3D illustrates a partial top cutaway view of the lens assembly 10 of FIGS. 1A-2 in a UNFOV configuration, with a switched UNFOV lens group moved into the optical axis 14 of the lens assembly 10. In the UNFOV configuration, the first zoom group 22 is moved to a fourth predetermined distance from the first lens, and the second zoom group 24 is moved to a fourth predetermined distance ($FL_4$) from the objective lens 16. The total distance between the objective lens 16 and the second zoom group 24 in the UNFOV configuration is also larger than the total distance between the objective lens 16 and the second zoom group 24 in the NFOV configuration. In addition, the fourth predetermined distance ($FL_4$) is large enough to accommodate the switched UNFOV lens group 30. In this embodiment, the UNFOV lens group 30 includes four lenses 76, 78, 80, 82 that operate in conjunction with the first zoom group 22 and the second zoom group 24 in the UNFOV configuration to provide an ultranarrow field-of-view, as required by the IFLIR specification.

Figure 4A:
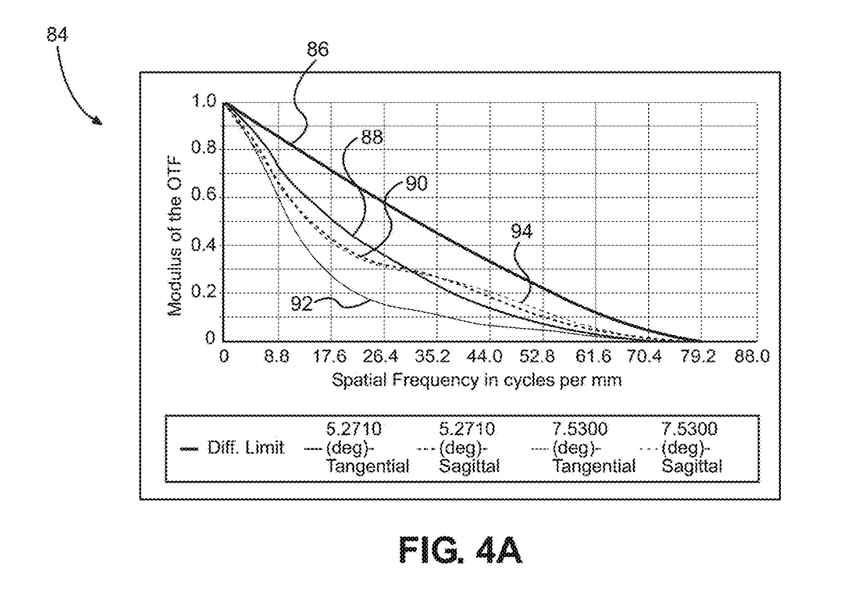
FIGS. 4A-4D are graphs illustrating the performance of the lens array in the medium-wave infrared (MWIR) band for the respective WFOV, MFOV, NFOV, and UNFOV configurations and respective focal ratios of F/2.5, F/2.5, F/2.5, and 4.0.

The lens assembly 10 of FIGS. 1A-3D has superior performance in the different usage conditions required by the IFLIR specification. In this regard, FIG. 4A is a graph 84 of the modulus of the optical transfer function (OTF) vs. the Spatial Frequency in cycles per mm for different portions of the image plane of the lens assembly 10 in the MWIR band for the WFOV configuration at F/2.5. The diffraction limit 86 of the modulus of the OTF vs. the Spatial Frequency is the theoretical performance limit. Plot 88 is the performance plot for 5.2710 degrees (Tangential) and plot 90 is the performance plot for 5.2710 degrees (Sagittal) in the image plane. Plot 92 is the performance plot for 7.5300 degrees (Tangential) and plot 94 is the performance plot for 7.5300 degrees (Sagittal) in the image plane of the lens assembly 10.

Figure 4B:
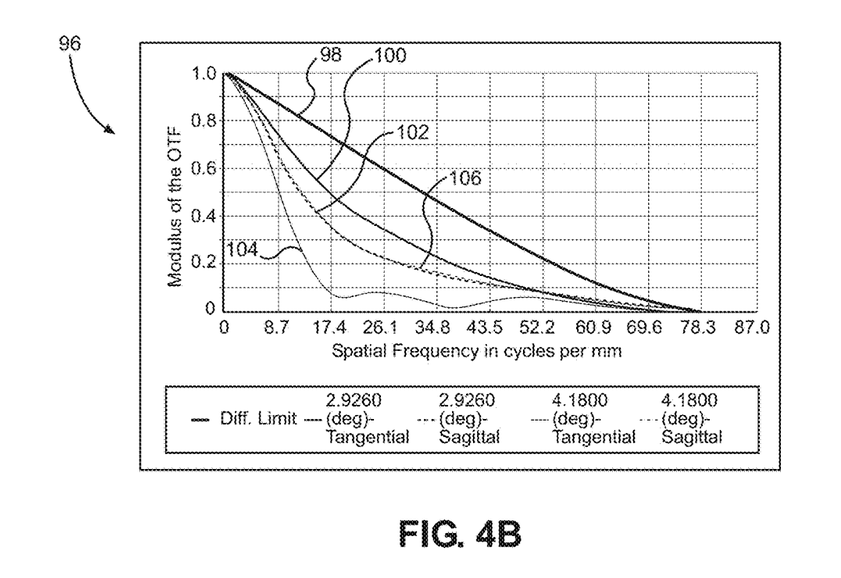

FIG. 4B is a graph 96 of the modulus of the OTF vs. the Spatial Frequency in cycles per mm for different portions of the image plane of the lens assembly 10 in the MWIR band for the MFOV configuration at F/2.5. The diffraction limit 98 of the modulus of the OTF vs. the Spatial Frequency is the theoretical performance limit. Plot 100 is the performance plot for 2.9260 degrees (Tangential) and plot 102 is the performance plot for 2.9260 degrees (Sagittal) in the image plane. Plot 104 is the performance plot for 4.1800 degrees (Tangential) and plot 106 is the performance plot for 4.1800 degrees (Sagittal) in the image plane of the lens assembly 10.

Figure 4C:
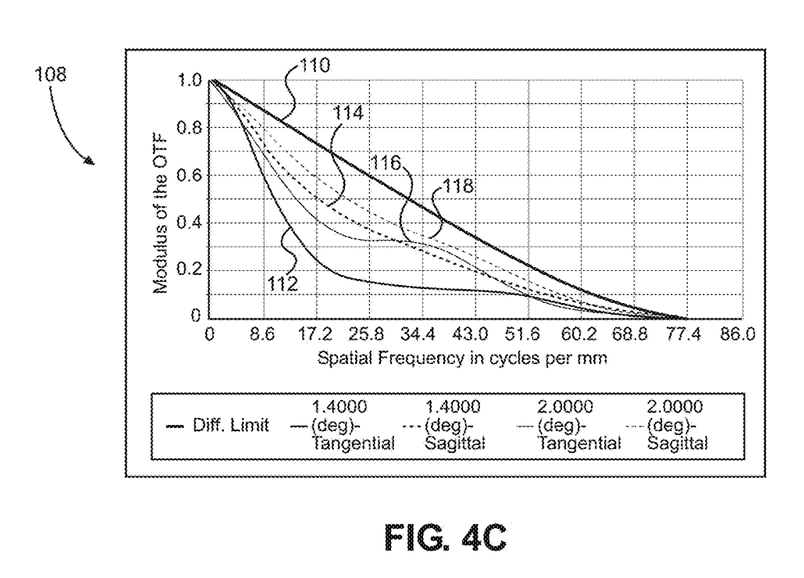

FIG. 4C is a graph 108 of the modulus of the OTF vs. the Spatial Frequency in cycles per mm for different portions of the image plane of the lens assembly 10 in the MWIR band for the NFOV configuration at F/2.5. The diffraction limit 110 of the modulus of the OTF vs. the Spatial Frequency is the theoretical performance limit. Plot 112 is the performance plot for 1.4000 degrees (Tangential) and plot 114 is the performance plot for 1.4000 degrees (Sagittal) in the image plane. Plot 116 is the performance plot for 2.0000 degrees (Tangential) and plot 118 is the performance plot for 2.0000 degrees (Sagittal) in the image plane of the lens assembly 10.

Figure 4D:
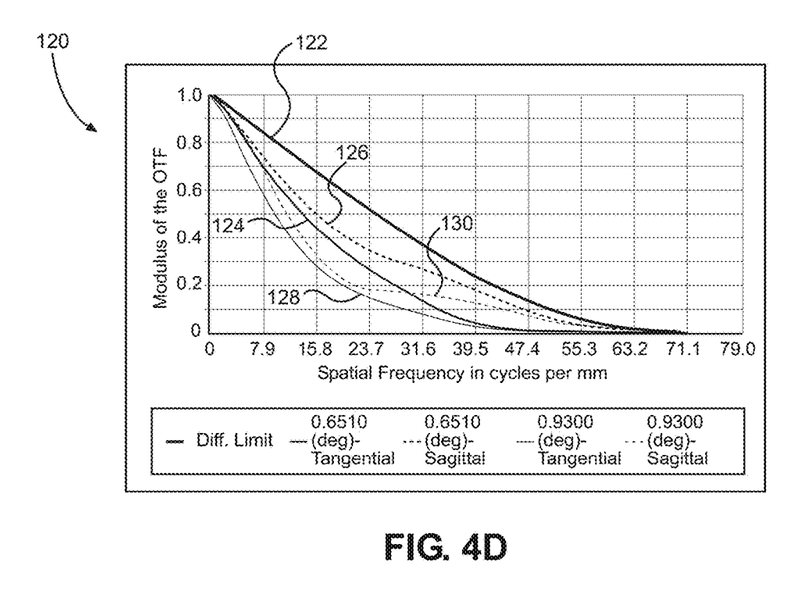

FIG. 4D is a graph 120 of the modulus of the OTF vs. the Spatial Frequency in cycles per mm for different portions of the image plane of the lens assembly 10 in the MWIR band for the UNFOV configuration at F/4.0. The diffraction limit 122 of the modulus of the OTF vs. the Spatial Frequency is the theoretical performance limit. Plot 124 is the performance plot for 0.6510 degrees (Tangential) and plot 126 is the performance plot for 0.6510 degrees (Sagittal) in the image plane. Plot 128 is the performance plot for 0.9300 degrees (Tangential) and plot 130 is the performance plot for 0.9300 degrees (Sagittal) in the image plane of the lens assembly 10.

Figure 5A:
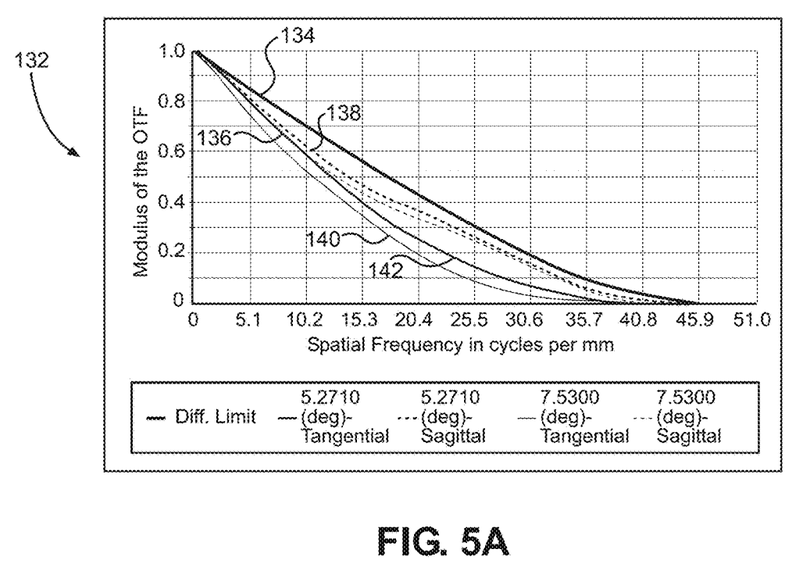
FIGS. 5A-5D are graphs illustrating the performance of the lens array in the long-wave infrared (LWIR) band for the respective WFOV, MFOV, NFOV, and UNFOV configurations and respective focal ratios of F/2.5, F/2.5, F/2.5, and F/4.0.

Similar performance is exhibited in the LWIR band. In this regard, FIG. 5A is a graph 132 of the modulus of the OTF vs. the Spatial Frequency in cycles per mm for different portions of the image plane of the lens assembly 10 in the LWIR band for the WFOV configuration at F/2.5. The diffraction limit 134 of the modulus of the OTF vs. the Spatial Frequency is the theoretical performance limit. Plot 136 is the performance plot for 5.2710 degrees (Tangential) and plot 138 is the performance plot for 5.2710 degrees (Sagittal) in the image plane. Plot 140 is the performance plot for 7.5300 degrees (Tangential) and plot 142 is the performance plot for 7.5300 degrees (Sagittal) in the image plane of the lens assembly 10.

Figure 5B:
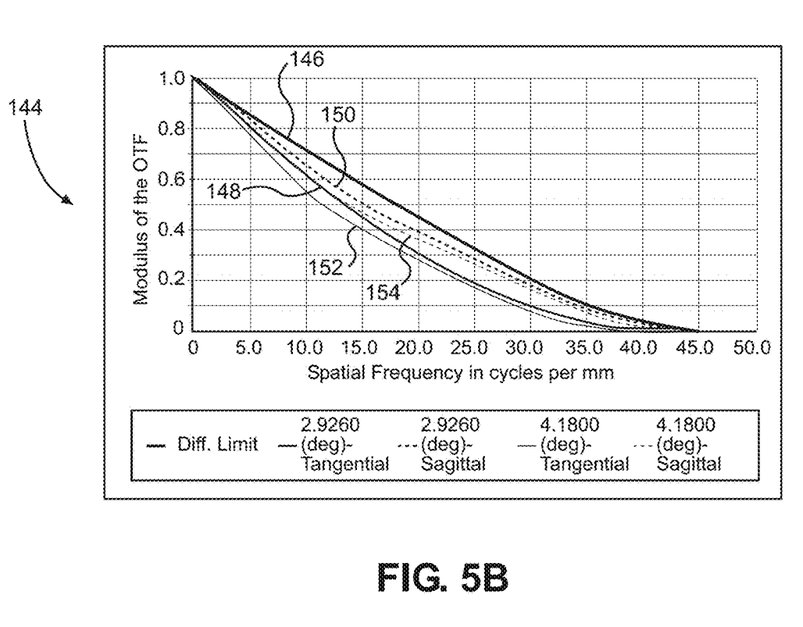

FIG. 5B is a graph 144 of the modulus of the OTF vs. the Spatial Frequency in cycles per mm for different portions of the image plane of the lens assembly 10 in the LWIR band for the MFOV configuration at F/2.5. The diffraction limit 146 of the modulus of the OTF vs. the Spatial Frequency is the theoretical performance limit. Plot 148 is the performance plot for 2.9260 degrees (Tangential) and plot 150 is the performance plot for 2.9260 degrees (Sagittal) in the image plane. Plot 152 is the performance plot for 4.1800 degrees (Tangential) and plot 154 is the performance plot for 4.1800 degrees (Sagittal) in the image plane of the lens assembly 10.

Figure 5C:
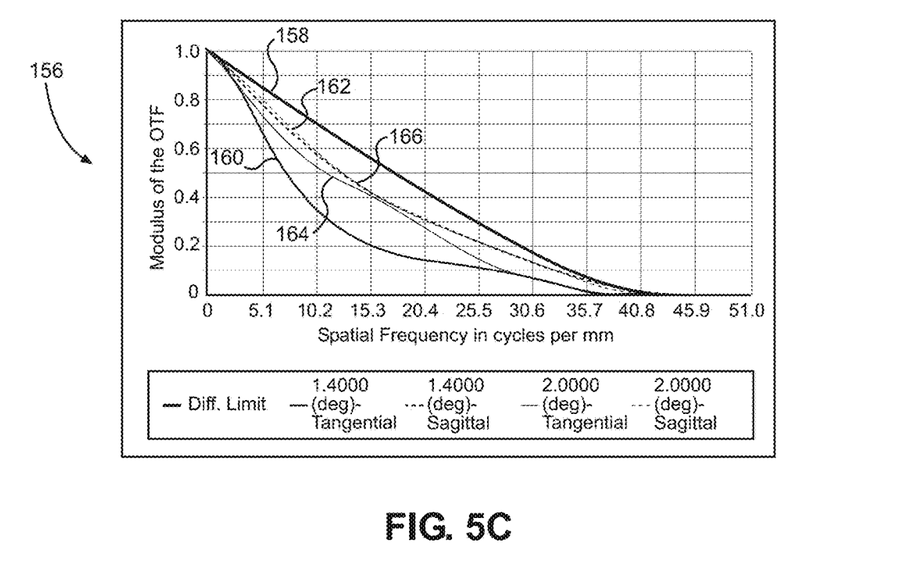

FIG. 5C is a graph 156 of the modulus of the OTF vs. the Spatial Frequency in cycles per mm for different portions of the image plane of the lens assembly 10 in the LWIR band for the NFOV configuration at F/2.5. The diffraction limit 158 of the modulus of the OTF vs. the Spatial Frequency is the theoretical performance limit. Plot 160 is the performance plot for 1.4000 degrees (Tangential) and plot 162 is the performance plot for 1.4000 degrees (Sagittal) in the image plane. Plot 164 is the performance plot for 2.0000 degrees (Tangential) and plot 166 is the performance plot for 2.0000 degrees (Sagittal) in the image plane of the lens assembly 10.

Figure 5D:
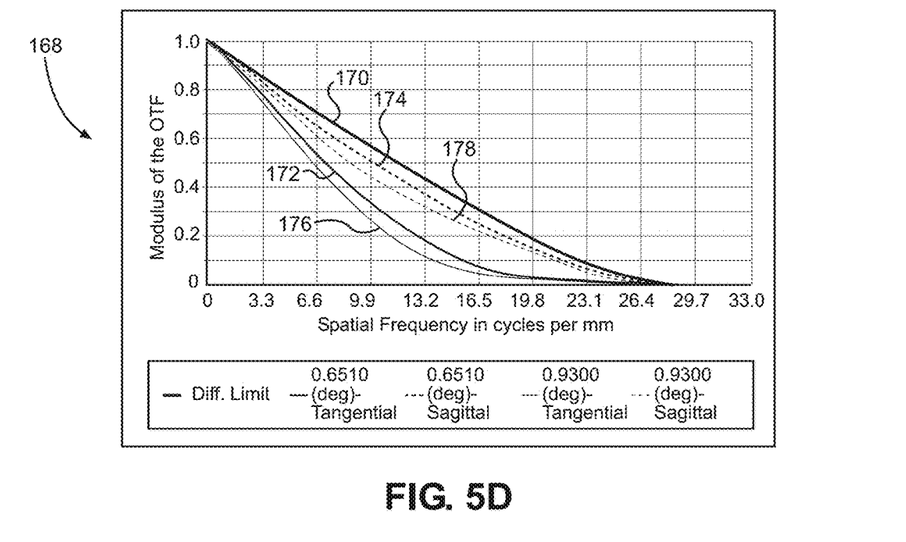

FIG. 5D is a graph 168 of the modulus of the OTF vs. the Spatial Frequency in cycles per mm for different portions of the image plane of the lens assembly 10 in the LWIR band for the UNFOV configuration at F/4.0. The diffraction limit 170 of the modulus of the OTF vs. the Spatial Frequency is the theoretical performance limit. Plot 172 is the performance plot for 0.6510 degrees (Tangential) and plot 174 is the performance plot for 0.6510 degrees (Sagittal) in the image plane. Plot 176 is the performance plot for 0.9300 degrees (Tangential) and plot 178 is the performance plot for 0.9300 degrees (Sagittal) in the image plane of the lens assembly 10.

Figure 6:
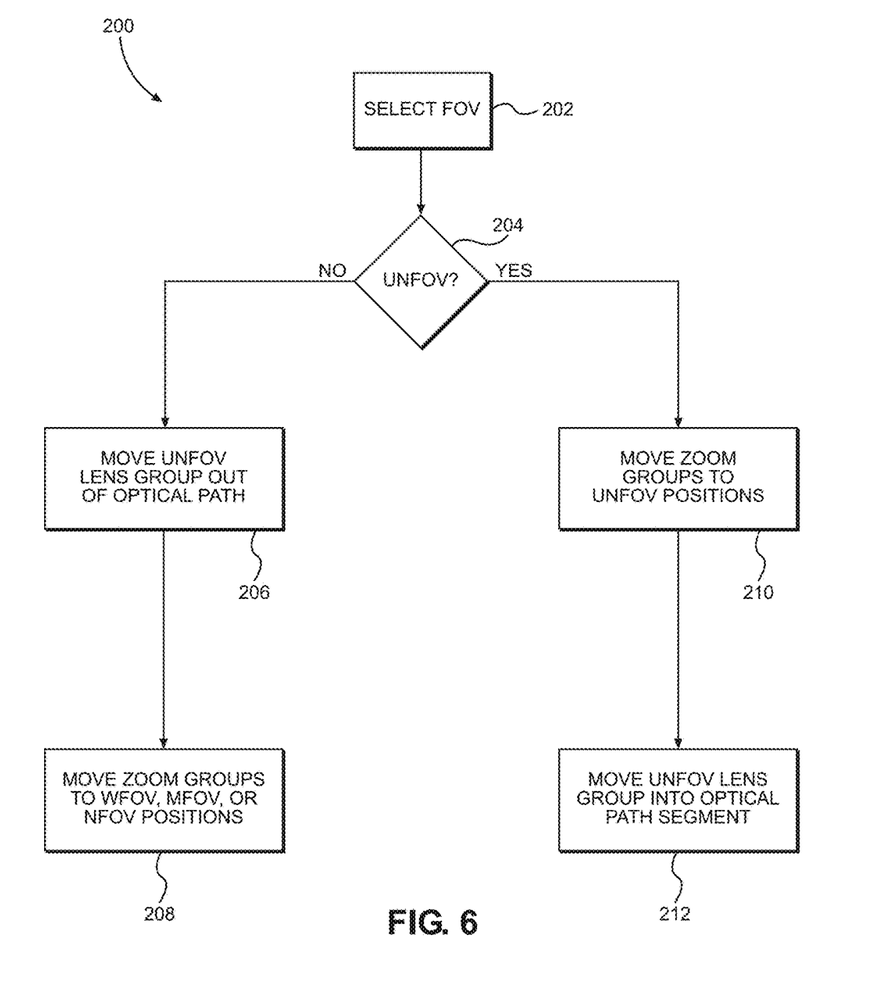
FIG. 6 is a flowchart diagram of a method of operating a lens assembly, such as the lens assembly of FIGS. 1A-3D, according to an embodiment.

Referring now to FIG. 6, a method 200 of operating a lens assembly, such as lens assembly 10, is disclosed. The method 200 includes selecting an FOV from a plurality of FOVs (block 202), and determining if the selected FOV is a UNFOV (block 204). If the FOV is not a UNFOV, a UNFOV lens group, such as UNFOV lens group 30, is moved out of an optical axis (block 206), if it has not been moved already. Zoom groups, such as zoom groups 20, 22, are next moved to respective WFOV, MFOV, or NFOV positions (block 208), depending on which FOV was selected. If the FOV is a UNFOV, the zoom groups are moved to their UNFOV positions on the optical axis (block 210), and the UNFOV lens group is moved into an optical path segment, such as optical path segment 20, on the optical axis (block 212).

Those skilled in the art will recognize improvements and modifications to the preferred embodiments of the disclosure. All such improvements and modifications are considered within the scope of the concepts disclosed herein and the claims that follow.

What is claimed is:
1. A lens assembly comprising:
   a housing defining an interior volume having a substantially linear optical axis extending therethrough;
   a first lens disposed in the housing on the optical axis;
   an aperture mechanism disposed in the housing on the optical axis, the first lens and the aperture mechanism defining an optical path segment therebetween;
   a zoom group disposed in the housing on the optical axis in the optical path segment, the zoom group movable between a plurality of field-of-view (FOV) positions along the optical path segment; and
   an ultra-narrow field-of-view (UNFOV) lens group movable between a first UNFOV position outside the opti- cal axis and a second UNFOV position on the optical axis in the optical path segment;

the lens assembly having a plurality of FOV configurations each comprising the zoom group disposed at one of the plurality of FOV positions, and wherein the UNFOV lens group is in the first UNFOV position; and the lens assembly having a UNFOV configuration comprising the zoom group disposed at one of the plurality of FOV positions, and wherein the UNFOV lens group is in the second UNFOV position.

2. The lens assembly of claim 1, wherein the plurality of FOV configurations included a wide field-of-view (WFOV) configuration, a medium field-of-view (MFOV) configuration narrower than the WFOV configuration, and a narrow field-of-view (NFOV) configuration narrower than the MFOV configuration.

3. The lens assembly of claim 2, wherein the interior volume is less than 824 cubic inches (824 in$^3$), and the optical path segment is less than 16.8 inches.

4. The lens assembly of claim 3, wherein each of the WFOV configuration, the MFOV configuration, the NFOV, configuration, and the UNFOV configuration is operable at a focal ratio of f/4.0, and each of the WFOV configuration, the MFOV configuration, and the NFOV configuration is operable at a focal ratio of f/2.5.

5. The lens assembly of claim 4, wherein each of the WFOV configuration, the MFOV configuration, the NFOV configuration, and the UNFOV configuration is operable in a medium-wave infrared (MWIR) band.

6. The lens assembly of claim 4, wherein each of the WFOV configuration, the MFOV configuration, the NFOV configuration, and the UNFOV configuration is operable in a long-wave infrared (LWIR) band.

7. The lens assembly of claim 2, wherein the zoom group comprises a first zoom group and a second zoom group, each of the first zoom group and second zoom group independently axially movable along the optical path segment.

8. The lens assembly of claim 7, wherein, in the WFOV configuration, the first zoom group is a first distance from the first lens, and the second zoom group is a second distance from the first lens greater than the first distance.

9. The lens assembly of claim 8, wherein, in the UNFOV configuration, the first zoom group is a third distance from the first lens, the second zoom group is a fourth distance from the first lens greater than the second distance, and the UNFOV lens group is a fifth distance from the first lens greater than the second distance and the third distance, and less than the fourth distance.

10. The lens assembly of claim 9, wherein, in the MFOV configuration, the first zoom group is a sixth distance from the first lens, and the second zoom group is a seventh distance from the first lens greater than the second distance and the sixth distance, and less than the fourth distance.

11. The lens assembly of claim 10, wherein, in the NFOV configuration, the first zoom group is an eighth distance from the first lens, and the second zoom group is a seventh distance from the first lens greater than the second distance and the eighth distance.

12. The lens assembly of claim 7, wherein, in the UNFOV configuration, the first zoom group is a first distance from the first lens, the second zoom group is a second distance from the first lens greater than the first distance, and the UNFOV lens group is a third distance from the first lens greater than the first distance, and less than the second distance.

13. The lens assembly of claim 1, wherein the optical path segment is devoid of a reflective optical element.

14. The lens assembly of claim 1, wherein the UNFOV lens group is configured to move between the first UNFOV position and the second UNFOV position along a path substantially normal to the optical axis.

15. The lens assembly of claim 14, wherein the UNFOV lens group is configured to rotate between the first UNFOV position and the second UNFOV position about a rotation axis substantially parallel to the optical axis.

16. The lens assembly of claim 14, wherein the zoom group comprises a first zoom group and a second zoom group, each of the first zoom group and second zoom group independently axially movable along the optical path segment, the second UNFOV position between the first zoom group and the second zoom group.

17. The lens assembly of claim 1, wherein the zoom group comprises a silicon lens.

18. The lens assembly of claim 17, wherein the silicon lens comprises float-zone silicon.

19. The lens assembly of claim 1, wherein the aperture mechanism is a variable aperture mechanism.

20. A method of operating a lens assembly, the method comprising:

moving a zoom group disposed in an interior volume of a housing to a predetermined FOV position along an optical path segment extending between a first lens disposed in the housing and an aperture mechanism disposed in the housing on a substantially linear optical axis; and moving a UNFOV lens group from a first UNFOV position outside the optical axis to a second UNFOV position on the optical axis in the optical path segment.

21. The method of claim 20, further comprising:

moving the UNFOV lens group from the second UNFOV position on the optical axis in the optical path segment to the first UNFOV position outside the optical axis; and moving the zoom group to a second predetermined FOV position corresponding to a predetermined FOV.

* * * * *